United States Patent
Watson et al.

(10) Patent No.: US 6,517,801 B2
(45) Date of Patent: Feb. 11, 2003

(54) TREATMENT OF GAS STREAMS CONTAINING HYDROGEN SULPHIDE

(75) Inventors: Richard William Watson, Near Ilkley (GB); Stephen Rhys Graville, Sheffield (GB); Vijay Ramanand Balse, Chatham, NJ (US)

(73) Assignee: The BOC Group plc, Windlesham (GB)

(*) Notice: Subject to any disclaimer, the term of this patent is extended or adjusted under 35 U.S.C. 154(b) by 49 days.

(21) Appl. No.: 09/827,223

(22) Filed: Apr. 5, 2001

(65) Prior Publication Data

US 2002/0006371 A1 Jan. 17, 2002

(30) Foreign Application Priority Data

Apr. 5, 2000 (GB) ............................... 0008384
Jun. 29, 2000 (GB) ............................... 0015982

(51) Int. Cl.$^7$ .................. B01D 53/48; B01D 53/52; C01B 17/04
(52) U.S. Cl. .................. 423/574.1; 423/220; 423/228; 423/237; 423/242.1; 423/573.1; 423/576.2; 423/576.8
(58) Field of Search ................ 423/237, 242.1, 423/573.1, 574.1, 576.2, 576.8, 220, 228

(56) References Cited

U.S. PATENT DOCUMENTS

| | | | |
|---|---|---|---|
| 4,124,685 A | 11/1978 | Tarhan et al. | 423/574 L |
| 4,919,912 A | 4/1990 | Taggart et al. | 423/574 R |
| 5,468,458 A | * 11/1995 | Watson | 423/222 |
| 5,556,606 A | 9/1996 | Khanmamedov | 423/228 |
| 6,403,051 B1 | * 6/2002 | Keller | 423/573.1 |

FOREIGN PATENT DOCUMENTS

| | | |
|---|---|---|
| DE | 25 24 124 | 12/1976 |
| EP | 0 565 316 A2 | 10/1993 |
| EP | 0 798 032 A1 | 10/1997 |

OTHER PUBLICATIONS

"Encyklopädie der technischen Chemie" 1982, VERLAG CHEMIE GMBH,WEINHEIM, GERMANY XP002178704 21, pp. 8–26.

* cited by examiner

Primary Examiner—Stanley S. Silverman
Assistant Examiner—Timothy C Vanoy
(74) Attorney, Agent, or Firm—Philip H. Von Neida; Salvatore P. Pace

(57) ABSTRACT

A feed gas stream containing hydrogen sulphide is subjected in a furnace 6 to reactions in which part of the hydrogen sulphide is burned to form sulphur dioxide, and is which the sulphur dioxide reacts with residual hydrogen sulphide to form sulphur vapor. The sulphur vapor is condensed from the gas stream exiting the furnace 6 in a sulphur condenser 16. Residual sulphur dioxide is reduced back to hydrogen sulphide by hydrogen in a reactor 22. Water vapor is removed from the reduced gas in a quench tower 28 to form a water vapor-depleted gas stream. One part of the water vapor-depleted gas stream is sent to an adsorber vessel 30 in which hydrogen sulphide is absorbed in an absorbent. The resulting hydrogen sulphide-depleted gas stream is vented from the vessel 30 as a purge stream. Another part of the water vapor-depleted gas stream and a hydrogen sulphide-rich gas formed by desorbing hydrogen sulphide from the absorbent in a vessel 38 are returned as recycle streams to the furnace 6.

16 Claims, 2 Drawing Sheets

TREATMENT OF GAS STREAMS CONTAINING HYDROGEN SULPHIDE

BACKGROUND OF THE INVENTION

This invention relates to a method of and apparatus for treating a feed gas stream containing hydrogen sulphide.

So-called acid gas streams containing hydrogen sulphide and carbon dioxide are formed as waste streams in, for example, oil and gas refineries. It is necessary to treat an acid gas stream so as to remove substantially all its content of hydrogen sulphide before it is discharged to the atmosphere. This removal of hydrogen sulphide is conventionally performed by the Claus process, in which part of the hydrogen sulphide content is burned in a furnace to form sulphur dioxide and water vapour; some of the resultant sulphur dioxide reacts in the furnace with residual hydrogen sulphide to form a gas mixture containing hydrogen sulphide, sulphur dioxide, carbon dioxide, water vapour and sulphur vapour, and also typically including hydrogen, carbon monoxide, carbon oxysulphide (carbonyl sulphide) and carbon disulphide. The sulphur vapour is extracted from the gas mixture by condensation, and the resulting gas mixture substantially free of sulphur vapour is subjected to a plurality of catalytic stages of further reaction between sulphur dioxide and hydrogen sulphide so as to form further sulphur vapour. The further sulphur vapour is extracted from the gas mixture downstream of each stage of catalytic reaction. A tail gas containing typically from 2 to 6 percent of the original sulphur content of the acid gas is thereby formed. The tail gas is sent for further treatment to remove substantially all the remaining sulphur compounds.

Increasingly, the environmental standards that the above-described treatment is required to meet are becoming more stringent. In some countries it is required that no more than three out of every thousand sulphur atoms that enter the process are discharged to the atmosphere. In other words, the percentage conversion of hydrogen sulphide to sulphur needs to be at least 99.7% to meet this standard. As a result, Claus plants have tended to become more complex with a greater number of catalytic stages of reaction between hydrogen sulphide and sulphur dioxide and a more elaborate tail gas clean up unit. This elaboration has added to the cost of the plant.

EP-A-0 565 316 relates to a process which makes possible a reduction in both the number and the size of the catalytic stages of reaction between hydrogen sulphide and sulphur dioxide, and in some examples can eliminate these stages altogether. In the process according to EP-A-0 565 316 some or all of the gas mixture leaving the sulphur condenser associated with the furnace is sent to a catalytic hydrogenator in which sulphur dioxide is reduced to hydrogen sulphide. Water vapour is then removed by condensation from the gas mixture exiting the catalytic hydrogenator. The resulting gas mixture depleted of water vapour is typically divided into two streams. One stream is recycled to the furnace. The other stream may be fed to a train of further but smaller, stages of reaction between hydrogen sulphide and sulphur dioxide, or in a few examples may be sent directly to an incinerator. In the examples in which the purge gas is sent directly to an incinerator, both the feed and the recycled gas streams are preheated to a temperature in the range of 100° C. to 300° C. It is stated that the recycle to feed ratio tends rapidly to increase with increasing percentage conversions above 98%, thereby increasing the need for preheating of the recycle and adding a requirement for increasing the size of the furnace. Accordingly such examples are not suitable for meeting a demand for 99.7% conversion of hydrogen sulphide to sulphur irrespective of the composition of the feed gas stream. It is also disclosed that hydrogen sulphide may be separated from the purge stream by washing it with a suitable amine.

U.S. Pat. No. 4,919,912 also discloses processes for recovering sulphur from a hydrogen sulphide containing gas stream in which an amine separation step is used. In the process according to U.S. Pat. No. 4,919,912 a sulphur dioxide bearing feed stream is reacted in a catalytic Claus reactor with a stream containing hydrogen sulphide and, after extraction of resulting sulphur vapour, residual sulphur dioxide is hydrogenated back to hydrogen sulphide. Hydrogen sulphide is then separated by absorption in an aqueous solution of a suitable amine and recycled to the catalytic Claus reactor as the hydrogen sulphide containing gas stream. In one class of processes according to U.S. Pat. No. 4,919,912 the sulphur dioxide bearing feed stream to the catalytic reactor is formed by combustion of a hydrogen sulphide stream. Some of the so-formed sulphur dioxide reacts with residual hydrogen sulphide to form some sulphur vapour. Removal of the resulting sulphur vapour is effected by precursory condensation upstream of the catalytic Claus reactor. This class is therefore in essence a conventional Claus process with only one catalytic stage of reaction between hydrogen sulphide and sulphur dioxide and with a tail gas clean up unit that recycles hydrogen sulphide to the catalytic Claus reactor.

The additional catalytic stage of reaction between hydrogen sulphide and sulphur dioxide in this process has the effect of reducing the mole fraction of hydrogen sulphide in the feed to the absorption unit and of thereby decreasing the amount of hydrogen sulphide which is recycled, thus making it far less advantageous in comparison with the process according to EP-A-0 565 316.

EP-A-0 798 032 relates to a modification of the process according to EP-A-0 565 316 in which catalytic stages of reaction between hydrogen sulphide and sulphur dioxide are avoided and in which downstream of the water removal stage the catalytically hydrogenated gas is compressed and subjected to fractional distillation to form a first fraction rich in hydrogen sulphide and a second fraction depleted of hydrogen sulphide. A stream of the second fraction is purged from the process, typically being sent to an incinerator, and a stream of the first fraction is returned to the furnace. This process has, however, a number of disadvantages which affect its suitability for commercial use. Firstly, because the separation by fractional distillation of hydrogen sulphide from carbon dioxide needs to be performed at below 0° C., it is necessary in the water removal stage to have complete extraction of water vapour from the catalytically hydrogenated gas. This adds considerably to the complexity of the water removal stage, an adsorption unit being required. Further, the requirement for compression of the water-depleted hydrogenated gas stream adds considerably to the operating and capital costs of the process. It is also necessary to provide a suitable refrigeration system to provide condensation at the top of the distillation column. Finally, above about a mole fraction of 0.8 for carbon dioxide, the separation becomes difficult due to the formation of a mixture displaying azeotropic characteristics, and an unreasonably large number of theoretical separation stages would be needed if it were desired to extract carbon dioxide in a high state of purity, ie with a low hydrogen sulphide content.

None of the above described processes provides a simple method of achieving particularly high effective percentage conversions to sulphur of the hydrogen sulphide content of the feed gas stream. It is an aim of the invention to provide a method and apparatus which is suitable for this purpose; and which is capable of obtaining a conversion of 99.7% or higher when the hydrogen sulphide content of the feed gas stream is at least 70% by volume.

SUMMARY OF THE INVENTION

According to the present invention there is provided a method of treating a feed gas stream containing hydrogen sulphide and carbon dioxide, comprising the steps of:

(i) burning in a furnace part of the hydrogen sulphide content of the feed gas stream so as to form sulphur dioxide and water vapour, supplying oxygen gas to the furnace to support combustion of the said part of the feed gas stream, and reacting in the furnace resulting sulphur dioxide with hydrogen sulphide so as to form an effluent gas stream containing sulphur vapour, water vapour, hydrogen sulphide, sulphur dioxide and carbon dioxide;

(ii) extracting the sulphur vapour from the effluent gas stream by condensation so as to form a sulphur-depleted gas stream;

(iii) reducing to hydrogen sulphide the sulphur dioxide and other reducible sulphur species in the sulphur-depleted gas stream so as to form a reduced gas stream;

(iv) removing most of the water vapour from the reduced gas stream by condensation so as to form a water vapour-depleted gas stream;

(v) contacting a first part of the water vapour-depleted gas stream with at least one liquid phase absorbent of hydrogen sulphide in at least one absorber vessel so as selectively to absorb hydrogen sulphide from the water vapour-depleted gas stream and to form a hydrogen sulphide-depleted gas stream;

(vi) discharging the hydrogen sulphide-depleted gas stream as a purge stream;

(vii) desorbing hydrogen sulphide from the said absorbent so as to form at least one hydrogen sulphide rich gas stream;

(viii) returning to the furnace as a first recycle stream or streams at least part of the said hydrogen sulphide-rich gas stream; and (ix) returning to the furnace as a second recycle stream a second part of the water vapour-depleted gas stream.

The invention also provides apparatus for the treatment of a feed gas stream containing hydrogen sulphide and carbon dioxide, comprising:

(a) a furnace arranged to burn in the presence of oxygen part of the hydrogen sulphide content of the feed gas stream so as to form sulphur dioxide and water vapour, and to allow reaction to take place between hydrogen sulphide and sulphur dioxide to form sulphur vapour, the furnace having an outlet for an effluent gas stream; containing sulphur vapour, water vapour, hydrogen sulphide, sulphur dioxide and carbon dioxide;

(b) a sulphur condenser for extracting sulphur vapour from the effluent gas stream and thereby forming a sulphur-depleted gas stream;

(c) a reactor for reducing to hydrogen sulphide the sulphur dioxide and other reducible sulphur species in the sulphur vapour depleted gas stream, and thereby forming a reduced gas stream;

(d) at least one water condenser for extracting from the reduced gas stream most of its water vapour content and thereby forming a water vapour depleted gas stream;

(e) at least one absorber vessel for contacting a first part of the water vapour depleted gas stream with at least one liquid phase absorbent of hydrogen sulphide, thereby to absorb hydrogen sulphide from the water vapour depleted gas stream and to form a hydrogen sulphide depleted gas stream;

(f) an outlet from the absorber vessel or one of the absorption vessels for discharging the hydrogen sulphide depleted gas stream as a purge stream;

(g) at least one desorber vessel for desorbing hydrogen sulphide from the said liquid phase absorbent, and thereby forming at least one hydrogen sulphide rich gas stream;

(h) means for conducting at least part of the said hydrogen sulphide-rich gas stream as a first recycle stream to the furnace; and (i) means for conducting a second part of the water vapour depleted gas stream as a second recycle stream to the furnace.

The method and apparatus according to the invention make it possible to obtain high effective conversions of the incoming hydrogen sulphide to sulphur. This result is achieved without a provision of any catalytic stages of reaction between hydrogen sulphide and sulphur dioxide and with only one stage of sulphur removal. When the feed gas stream contains at least 70% by volume of hydrogen sulphide, even the most stringent of current environmental standards can readily be met, as it is readily possible to obtain an effective percentage conversion of hydrogen sulphide in the feed gas stream to sulphur which exceeds 99.7% or even 99.9%, i.e. more than 99.7% of all sulphur atoms in the feed gas stream are recovered by the condensation of the sulphur vapour. Lower concentrations of hydrogen sulphide can however be employed in the feed gas provided that a stable flame can be maintained in the furnace. If necessary, such techniques as preheating the feed gas, pre-concentrating it in hydrogen sulphide, or the addition of other another combustible gas to it may be employed to facilitate maintenance of a stable flame.

Combustion of hydrogen sulphide in the furnace is supported by supplying to it either commercially pure oxygen or air highly enriched in oxygen. Preferably the air highly enriched in oxygen contains at least 80% by volume of oxygen, and more preferably at least 90% by volume of oxygen. By employing commercially pure oxygen or air highly enriched in oxygen to support combustion of the hydrogen sulphide, the rate at which non-reacting gases, particularly argon and nitrogen, enter the furnace is kept down. As a result, the capacity of downstream treatment units can be kept down and the attainment of an adequate flame temperature in the furnace is facilitated. By not sending all the water vapour depleted gas stream to the hydrogen sulphide absorption stage, a further reduction in the capacity of absorber and desorber vessels employed respectively to absorb and desorb hydrogen sulphide can be achieved.

The flow rate of the purge stream or the first part of the water vapour depleted gas stream is preferably controlled so as substantially to prevent build up of inert gases in the first and second recycle streams. If such a build up did occur and were allowed to continue the method according to the invention would typically eventually reach a point at which the recycle flows were so large that it would no longer be possible to maintain a stable flame in the furnace.

Typically, the flow rate of the second recycle stream exceeds the flow rate of the first recycle gas stream(s).

If desired, the furnace may be operated with an upstream combustion stage and a downstream thermal reaction stage. The first recycle gas stream is preferably sent to the upstream combustion stage. Particularly if the feed gas stream contains ammonia, the second recycle gas stream, or at least part of it, is preferably sent to the downstream thermal reaction stage. Such an arrangement facilitates the complete destruction of ammonia in the upstream combustion stage.

It is typically found that at least 90% of all the sulphur dioxide that is formed in the furnace is reduced to sulphur by reaction with hydrogen sulphide. In a conventional Claus process the mole ratio of hydrogen sulphide to oxygen available for reaction therewith entering the furnace is normally of the order of two to one, but the conversion of sulphur dioxide to sulphur is typically less then 70%. Preferably, in the method according to the invention the mole ratio of hydrogen sulphide to available oxygen is at least 3 to 1 so as to facilitate reaction of sulphur dioxide with hydrogen sulphide. Oxygen which reacts with other combustibles, notably hydrocarbons and ammonia, is deemed not to be available for reaction with hydrogen sulphide.

It is particularly preferred that the temperature at which the feed gas stream is fed to the furnace is in the range of 0° C. to 90° C., more preferably in the range of 10° C. to 60° C. It is therefore unnecessary to provide in the apparatus according to the invention a preheater for preheating the feed gas stream. Similarly, the first and second recycle streams are preferably introduced to the furnace at a temperature in the range of 0° C. to 90° C., more preferably 10° C. to 50° C., so as to make unnecessary the provision of any recycle gas reheater.

The liquid absorbent of hydrogen sulphide is typically an aqueous solution of an amine adapted for the selective separation of hydrogen sulphide from carbon dioxide. Such amines are well known in the art and generally contain substituents which sterically hinder the absorption of carbon dioxide. A particularly preferred absorbent is methyidiethanolamine (MDEA). Other suitable absorbents of hydrogen sulphide are disclosed in U.S. Pat. No. 4,919,912. The choice of absorbent and the number of theoretical stages of absorption make it possible to manipulate the composition of, both the first recycle stream and the purge stream, thereby offering additional flexibility in the operation of the method according to the invention and thereby facilitating its optimisation. Typically, there is a single hydrogen sulphide absorber vessel and a single hydrogen sulphide desorber vessel. Alternatively, there may be two hydrogen sulphide absorber vessels arranged in series with a hydrogen sulphide lean gaseous fraction being sent from the upstream vessel to the downstream vessel for further separation, and preferably with the absorbent in the upstream vessel being different from that used in the downstream vessel, the absorbent in the downstream vessel having a higher selectivity for hydrogen sulphide than the one in the upstream vessel. Such an arrangement has the advantage of making it possible to minimise the hydrogen sulphide concentration in the purge stream.

When two absorber vessels are employed, there are preferably two desorber vessels, each being employed to form a hydrogen sulphide rich gas stream, the hydrogen sulphide rich gas streams being returned separately or together to the furnace as the first recycle gas streams.

The first part of the water vapour depleted gas stream is preferably contacted with the liquid phase absorbent at a temperature in the range of 50° C. to 90° C. Such an elevated temperature limits the amount of cooling that needs to be performed in step (iv) with a method according to the invention when condensing the water vapour out of the reduced gas stream.

The contact of part or all of the water vapour-depleted gas stream with the liquid phase absorbent of hydrogen sulphide is preferably performed countercurrently in a liquid-vapour contact column.

Hydrogen sulphide is preferably desorbed from the absorbent at a pressure greater than that which it is absorbed. The absorption pressure is preferably a little above atmospheric pressure, such that the hydrogen sulphide depleted gas stream may be conveyed to an incinerator or a downstream process for recovering sulphur, if any, without the need for repressurisation, and may therefore typically be in the range of 1.1 bar to 1.3 bar absolute. The desorption pressure is chosen to be sufficient for the first recycle stream to be able to flow back to the furnace without the aid of a fan or ejector. On the other hand, it is preferred to employ a fan or ejector to aid the flow of the second recycle stream to the furnace.

The purge gas is preferably sent to an incinerator in order to convert to sulphur dioxide the final traces of hydrogen sulphide. Alternatively, it may be sent to another process for recovering sulphur from sulphur containing gases.

The sulphur dioxide content of the sulphur-depleted gas stream is preferably reduced to hydrogen sulphide by hydrogen. Sufficient hydrogen may typically be formed in situ by the thermal cracking of hydrogen sulphide during step (i) of the method according to the invention. If desired, an external source of hydrogen can be provided to ensure that there is always an adequate amount of hydrogen available for reduction of the sulphur dioxide in the reactor.

BRIEF DESCRIPTION OF THE DRAWINGS

The method and apparatus according to the invention will now be described by way of example with reference to the accompanying drawings, in which.

The drawings are not to scale.

DETAILED DESCRIPTION OF THE INVENTION

Figure 1:
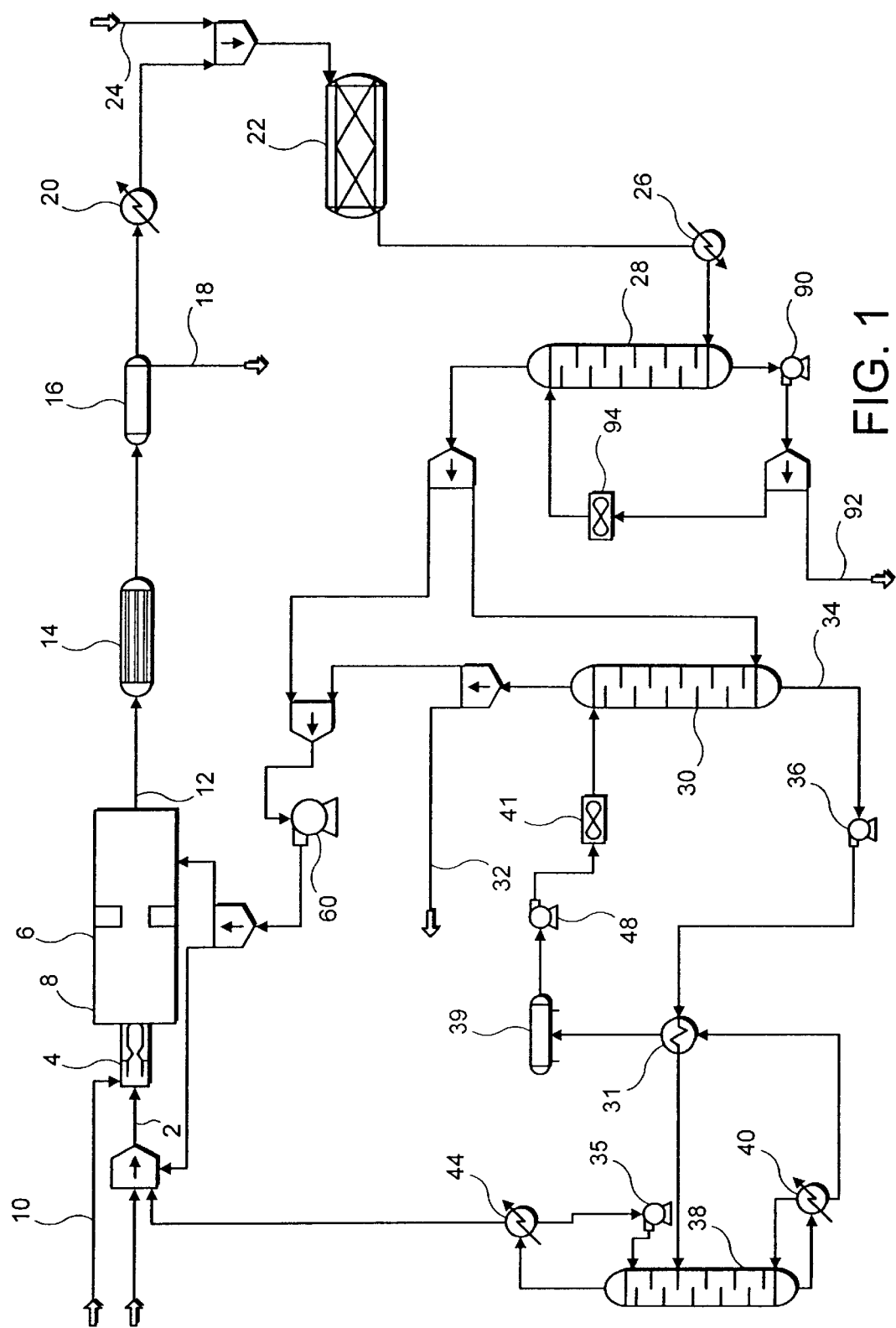
FIG. 1 is a schematic flow diagram of a sulphur recovery plant.

Referring to FIG. 1 of the drawing, a hydrogen sulphide containing feed gas stream typically comprising hydrogen sulphide, carbon dioxide and water vapour, and sometimes additionally including one or more of hydrocarbons and ammonia is fed from a pipeline 2 to a burner 4 which fires into a thermal reactor in the form of a refractory-lined furnace 6 typically through one end wall 8 thereof or through a sidewall at a position close to the end wall 8, typically at right angles to the axis of the furnace. The feed gas stream typically contains at least 70% by volume of combustibles. If the feed gas stream is a waste stream from an oil refinery it may be an acid gas (sometimes referred to as "amine gas"), or a mixture of amine gas with sour water stripper gas. The hydrogen sulphide containing feed gas stream is supplied to the burner or typically at a temperature in the range of 0° C. to 90° C., preferably 10° C. to 60° C., and is typically not preheated upstream of the furnace 6. The burner 4 is supplied separately from a pipeline 10 with a stream of commercially pure oxygen or a stream of air highly enriched in oxygen. In either case, the mole fraction of oxygen in the gas that is supplied along the pipeline 10 is preferably at least 0.8. Indeed, the oxygen stream typically contains at least 90% by volume of oxygen and may be separated from air by, for example, pressure swing adsorption or by fractional distillation, the latter separation method being able to produce oxygen at a purity in excess of 99%.

By means of the burner 4 a part of the hydrogen sulphide content of the feed gas is burned in the furnace 6. The rate of flow of oxygen or oxygen-enriched air along the pipeline 10 relative to the rate of flow of feed gas along the pipeline 2 is such that any hydrocarbon in the feed gas is completely oxidised, whereas only a part of the incoming hydrogen sulphide is oxidised. In addition any ammonia present is desirably completely destroyed. Thus, several chemical reactions take place in the furnace 6. Firstly, there are combustion reactions in which any hydrocarbon is completely oxidised to carbon dioxide and water vapour. Ammonia present is oxidised to nitrogen and water vapour. Care is normally taken to ensure that there is an adequate temperature (preferably at least 1300° C.) to effect the oxidation of ammonia. If the ammonia is not completely destroyed, it may partake in undesirable side reactions forming substances that deposit a solid on relatively low temperature parts of the plant, thereby increasing the pressure drop to which the gas stream is subjected as it flows through the illustrated plant. However, in the method according to the invention the catalytic hydrogenation unit (to be described below) operates at a temperature well in excess of that at which such deposition of solids will occur. Accordingly, unlike a conventional Claus process, complete destruction of ammonia may not be a practical necessity. The main combustion reaction is, however, the burning of hydrogen sulphide to form water vapour and sulphur dioxide. Part of the resultant sulphur dioxide reacts with residual hydrogen sulphide to form sulphur vapour and further water vapour.

Another important reaction that takes place in the flame zone of the furnace 6 is the thermal dissociation of a part of the hydrogen sulphide into hydrogen and sulphur vapour. In addition, if ammonia is present, some thermal dissociation of it into hydrogen and nitrogen will take place. Employing a combustion supporting gas rich in oxygen facilitates thermal dissociation (also known as thermal cracking) of hydrogen sulphide and ammonia. Various other reactions may also take place in the furnace 6 such as the formation of carbon monoxide, carbon oxysulphide and carbon disulphide.

In general, it is preferred to employ a high flame temperature (eg in the range of 1250° C. to 1650° C.) so as to favour the reaction between hydrogen sulphide and sulphur dioxide and also to favour thermal dissociation of hydrogen sulphide and ammonia. In operating the burner 4 and the furnace 6, care should of course be taken to avoid damage to the furnace lining. The angle and position of entry of the burner 4 into the furnace 6 and the flame configuration are chosen so as to avoid such damage. The thermal dissociation of hydrogen sulphide has a cooling effect which can be taken into account in selecting the position and angle of entry of the burner 4.

As a result of the reactions that take place in the furnace 6, an effluent gas stream typically comprising hydrogen sulphide, sulphur dioxide, water vapour, sulphur vapour, hydrogen, carbon dioxide, carbon monoxide, argon, nitrogen and traces of carbon oxysulphide leaves the furnace 6 through an outlet 12, typically at a temperature greater than 900° C. At such temperatures, some of the components of the effluent gas stream are still reacting with one another so it is difficult to specify the precise composition of the gas mixture in the outlet 12. The gas stream passes from the outlet 12 directly into a waste heat boiler 14 or other form of heat exchanger in which it is cooled to a temperature in the range of 250° C. to 400° C. During the passage of the gas stream through the waste heat boiler 14, there is a tendency for some of the hydrogen to reassociate with sulphur to form hydrogen sulphide. The cooled effluent gas stream passes from the waste heat boiler 14 to a sulphur condenser 16 in which it is further cooled to a temperature in the range of 120° C. to 160° C. and in which the sulphur vapour is condensed and is extracted via an outlet 18. The resulting liquid sulphur is typically passed to a sulphur seal pit (not shown). The resulting sulphur vapour-depleted gas stream (now typically containing only traces of sulphur vapour) is heated downstream of the condenser 16 to a temperature in the range of 250° C. to 350° C., typically about 300° C., for example, by indirect heat exchange with superheated steam or a hot gas, in a reheater 20.

The thus reheated sulphur vapour depleted gas stream flows into a catalytic reactor 22, which in one example of the method according to the invention includes a catalyst of cobalt-molybdenum oxides that catalyses reduction by hydrogen to hydrogen sulphide of all the sulphur dioxide and any traces of sulphur vapour. A number of other reactions can take place in the reactor 22. In particular, any carbon monoxide present reacts with water vapour to form hydrogen and carbon dioxide. Further, at least 90% by volume but not all of any carbon oxysulphide present in the sulphur vapour depleted gas stream is hydrolysed in the catalytic reactor to carbon dioxide and hydrogen sulphide. Similarly, any carbon disulphide present in the sulphur vapour depleted gas stream is also hydrolysed to carbon dioxide and hydrogen sulphide. Therefore essentially the entire content of reducible sulphur species in the sulphur vapour depleted gas mixture is reduced to hydrogen sulphide.

At least some of the hydrogen necessary for the reduction reactions that take place in the reactor 22 is present in the sulphur vapour depleted gas stream itself. Accordingly, there is often no need to add the necessary hydrogen reductant from an external source. It is preferred, nonetheless, to have available a pipeline 24 for the addition of external hydrogen at a rate sufficient to cause the complete reduction to hydrogen sulphide of all the sulphur and sulphur dioxide present. The external hydrogen may be generated on site, by, for example, partial oxidation of hydrocarbon, preferably using pure oxygen or oxygen-enriched air as the oxidant.

A resulting reduced gas stream, now consisting essentially of hydrogen sulphide, water vapour, carbon dioxide, nitrogen and argon, leaves the catalytic reactor 22 and flows through a heat exchanger 26 in which it is cooled to a temperature in the range of 100° C. to 200° C. by indirect heat exchange with water and/or steam. The thus cooled gas stream is introduced into a desuperheating, direct contact, quench tower 28. In the quench tower 28, the gas stream flows upwardly and comes into contact with a descending stream of water. The reduced gas stream is thus cooled and a large proportion (typically in excess of 85%) of its water vapour condensed, the condensate entering the descending liquid stream. The condenser 28 preferably contains a random or structured packing (not shown) so as to facilitate mass transfer between the ascending vapour and descending liquid. As a result, a water vapour-depleted gas stream is formed. The water exiting the bottom of the quench tower 28 is recirculated by means of a pump 90 and cooled in a cooler 94 upstream of being reintroduced into the top of the quench tower 28. Excess water is removed through an outlet 92 and sent to a sour water stripper (not shown).

The water vapour depleted gas stream is divided into two subsidiary streams. A first subsidiary stream (or first part) of the water-vapour depleted gas stream is sent to an absorber vessel 30 in which it is contacted with a liquid absorbent effective selectively to separate hydrogen sulphide from carbon dioxide and the other gaseous components of the water vapour depleted gas stream. The first subsidiary stream of water vapour depleted gas typically enters the absorber vessel 30 at the temperature at which it leaves the quench tower 28, typically a temperature in the range of 50° C. to 90° C. In the absorber vessel 30, the water vapour depleted gas stream flows upwardly and comes into contact with a descending stream of the absorbent, typically an aqueous solution of MDEA. The absorber vessel 30 contains liquid-vapour contact means, typically a random or structured packing, so as to facilitate mass exchange between the ascending gas and the descending liquid. As the gas ascends the vessel 30 it becomes progressively leaner in hydrogen sulphide, whereas as the liquid descends the vessel 30 it becomes progressively richer in hydrogen sulphide. The hydrogen sulphide depleted gas leaves the top of the absorption vessel 30 through an outlet 32 as a purge gas and typically contains of the order of 0.1% by volume of hydrogen sulphide. The purge gas is typically sent to an incinerator (not shown) so as to convert to sulphur dioxide its residual hydrogen sulphide content. The gas from the incinerator is typically vented to the atmosphere through a stack (not shown).

Liquid absorbent charged with hydrogen sulphide passes out of the absorber vessel 30 through an outlet 34 and is pumped by means of a pump 36 into an upper region of the desorber (or stripper) vessel 38. The desorber vessel 38, which is operated at a higher pressure than the absorber vessel 30, has a reboiler 40 associated with it. The reboiler 40 takes the form of an indirect heat exchanger in which liquid at the bottom of the vessel 38 is boiled by indirect heat exchange with steam. Absorbed gas is thus desorbed from the liquid. A vapour flow up the vessel 38 is thus created with the result that hydrogen sulphide (and any carbon dioxide) is stripped from descending liquid. The vessel 38 is provided with liquid-vapour contact devices, typically in the form of random or structured packing, so as to facilitate mass transfer between the descending liquid and the ascending vapour. The hydrogen sulphide rich gas stream leaving the top of the desorber vessel 38 is preferably passed through a condenser 44 in which it is cooled by indirect heat exchange with water. Water vapour and any vaporous absorbent are condensed and are typically returned to he top of the desorber vessel 38 by means of a reflux pump 35. Liquid absorbent relatively free of hydrogen sulphide flows from the reboiler 40 through a heat exchanger 31 in which it pre-heats by indirect heat exchange the flow of absorbent charged with hydrogen sulphide to the desorber vessel 38. The thus cooled hydrogen sulphide-free absorbent is collected in a storage vessel 39 which is employed as the source of absorbent for the absorber vessel 30. Absorbent is conveyed from the vessel 39 to the top of the vessel 30 by means of a pump 48 vial a cooler 41.

The hydrogen sulphide rich gas typically leaves the condenser 44 at a temperature in the range of 10° C. to 50° C. and flows back as a first recycle stream, without being reheated, to the furnace 6. Typically, the first recycle stream is mixed with the incoming feed gas stream upstream of the burner 4. The pressure at which the desorber vessel 38 is operated is such that this flow of the first recycle stream to the furnace 6 does not require to be assisted by any fan or ejector.

That part of the water vapour depleted gas stream which is not sent to the absorber vessel 30 is returned to the furnace 6 as a second recycle stream. The second recycle stream is preferably not reheated, but a fan or ejector 60 is typically employed to effect its flow back to the furnace 6. If desired, some or all of the second recycle stream may be returned to a downstream region of the furnace 6. Alternatively, or in addition, some or all of the second recycle stream may be mixed with the feed gas stream upstream of the burner 4.

In a conventional Claus process, a tail gas clean-up unit including hydrogen sulphide absorption and desorption stages may be employed. The total flow rate of gas through the absorption stage is typically more than twice the flow rate of fresh feed acid gas through the furnace. In the method according to the invention, however, the flow rate of the gas into the absorber vessel 30 is typically less than a quarter of the flow rate of the fresh feed acid gas through the furnace 6. As a result, the diameter of the absorber vessel 30 is substantially less than for the conventional Claus process, thereby considerably reducing its capital cost.

Typically, particularly when the feed gas stream contains at least 70% by volume of hydrogen sulphide, and commercially pure oxygen is used to support combustion in the furnace 6, the flow rate of the second recycle stream exceeds that of the first recycle stream.

The size of the purge gas stream is arranged such that build-up of nitrogen, argon and carbon dioxide in the plant shown in the drawing is avoided. Thus the rates at which nitrogen and argon are vented in the purge gas are equal to the rates at which such gases enter the plant in the feed gas stream and in the oxygen or oxygen-enriched air. In the case of carbon dioxide account needs to be taken of any carbon dioxide that is formed in the furnace 6 through combustion of hydrocarbons. For a given absorbent and a given number of theoretical stages in the absorber 30, the need to have a set flow of purge gas out of the plant shown in the drawing determines the flow rate of water depleted gas into the absorber and hence the flow rate of the second recycle gas stream and the ratio of the flow rate of the second recycle gas stream to the flow rate of the first recycle gas stream.

The lower the content of carbon dioxide, argon and nitrogen in the feed gas stream and in the oxygen or oxygen-enriched air that enters the furnace 6, the smaller the size of the purge stream and hence the smaller the size of the absorber vessel 30. It is therefore generally desirable to minimise the level of impurities in the oxygen that is used to support combustion in the furnace 6. The flame temperature in the furnace 6 depends in part on the rate at which "inerts", i.e. carbon dioxide, water vapour, nitrogen and argon enter it. The sources of the inerts are not only the feed gas stream and impurities in the oxygen which is used to support combustion but also the first and second recycle streams. Since the second recycle stream tends to have a larger concentration of inerts than the other streams it tends to depress the flame temperature. Accordingly, it is often preferred to introduce at least part of the second recycle stream into the furnace 6 downstream of its flame zone so as not unduly to depress the flame temperature. In fact, the main limit on the operability of the method according to the invention is the concentration of inerts in the feed gas stream. As this concentration rises, so the flame temperature tends to fall. If the temperature of the effluent gas stream leaving the furnace 6 does not exceed about 1000° C. difficulties can arise in maintaining a stable flame. Typically this condition can occur if the level of inerts in the feed gas stream is more than 30% by volume depending on the precise composition of the feed gas stream and the composition of the oxygen stream that is used to support combustion in the furnace. If necessary, the feed gas stream can be pre-purified to remove some inerts therefrom or one or more of the feed gas stream, the first recycle stream, and the second recycle stream can be preheated.

Various different techniques may be used for starting up the plant shown in the accompanying drawing. The simplest is initially to substitute for the second recycle stream a flow of inert gas (e.g. nitrogen) from an external source and gradually to reduce this flow as the flow of the recycle streams builds up.

The return of the first and second recycle streams to the furnace 6 has the effect of making the mole ratio of hydrogen sulphide to oxygen entering the plant much greater than in a conventional Claus process. Indeed, the relative rate of supplying oxygen molecules to the furnace 6 compared with that of hydrogen sulphide molecules is deliberately chosen to be relatively low such that there is a large deficit of oxygen molecules in comparison with the amount of oxygen molecules required for the oxidisation to sulphur vapour and water vapour of one third of the hydrogen sulphide molecules entering the furnace 6 in the feed and recycle streams. As a result, typically at least 90% of the sulphur dioxide molecules that are formed in the furnace 6 react with hydrogen sulphide to form sulphur vapour. In consequence, the amount of reduction reaction that is performed in the catalytic reactor 22 is kept down.

Figure 2:
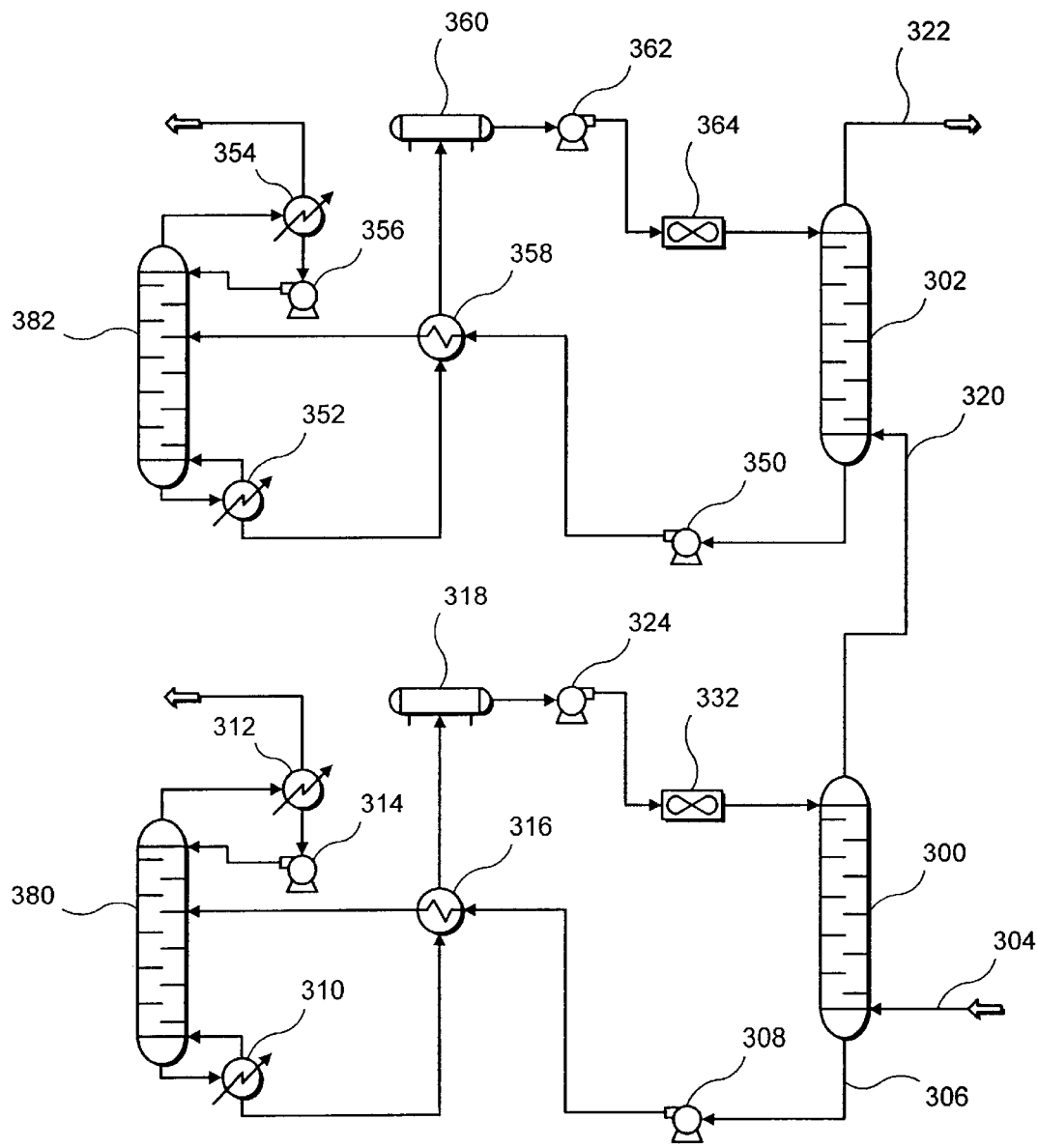
FIG. 2 illustrates a modification to the plant shown in FIG. 1.

Referring now to FIG. 2 of the drawings, there is shown a modification to the plant shown in FIG. 1, in which instead of a single hydrogen sulphide absorber vessel 30, two such vessels 300 and 302 are employed, and instead of a single hydrogen sulphide desorber vessel 38, two such vessels 380 and 382 are employed. The first part of the water vapour depleted gas flows into the vessel 300 through an inlet 304. Hydrogen sulphide is absorbed therefrom by countercurrent contact with an aqueous solution of a first selective absorbent of hydrogen sulphide, for example MDEA. A gas depleted of hydrogen sulphide passes out of the top of the vessel 300 and enters the bottom of the vessel 302 through an inlet 320. Most of the residual hydrogen sulphide in the gas entering the vessel 302 is absorbed in a second selective absorbent of hydrogen sulphide, for example a sterically hindered amine of the kind sold under the trade mark FLEXSORB, having a selectivity for hydrogen sulphide which is greater that of MDEA, by countercurrent contact therewith. A gas mixture essentially free of hydrogen sulphide is purged from the plant through the outlet 322.

Liquid absorbent charged with hydrogen sulphide passes out of the vessel 300 through an outlet 306 and is pumped by means of a pump 308 into an upper region of the desorber vessel 380. The vessel 380 has a reboiler 310 associated with it whose operation has the effect of causing thermal desorption of dissolved gas, predominantly hydrogen sulphide. A resulting gas mixture rich in hydrogen sulphide leaves the top of the desorber vessel and passes through a condenser 312 in which any vaporised absorbent is returned by means of a reflux pump 314 to the top of the desorber vessel 380. Liquid absorbent relatively free of hydrogen sulphide flows from the reboiler 310 through a heat exchanger 316 in which it pre-heats by indirect heat exchange the flow of absorbent charged with hydrogen sulphide to the desorber vessel 380. The thus cooled hydrogen sulphide-free absorbent is collected in a storage vessel 318 which is employed as the source of absorbent for the absorber vessel 300. Absorbent is conveyed from the storage vessel 318 by means of a pump 324 to the top of the absorber vessel 300 via a cooler 332.

The gas which is not condensed in the condenser 312 forms a primary first recycle gas stream to the furnace of the plant shown in FIG. 1.

The absorber vessel 302 has a desorber vessel 382 associated with it. The arrangement is analogous to that of the vessels 300 and 380. A pump 350 is employed to introduce hydrogen sulphide-laden absorbent into an upper region of the vessel 382. The vessel 382 has a bottom reboiler 352 operable to strip hydrogen sulphide gas from the liquid phase and a top condenser 354 to condense any vaporised absorbent discharged from the top of the vessel 382 with the gas phase. A reflux pump 356 returns condensate to the top of the vessel 382. Liquid absorbent relatively free of hydrogen sulphide flows from the reboiler 352 through a heat exchanger 358 in which it pre-heats by indirect heat exchange the flow of absorbent charged with hydrogen sulphide to the desorber vessel 382. The thus cooled hydrogen sulphide free absorbent is collected in a storage vessel 360 which is employed as the source of absorbent for the absorber vessel 302. Absorbent is conveyed from the storage vessel 360 by means of a pump 362 to the top of the vessel 300 via a cooler 364.

The gas which is not condensed in the condenser 354 forms a secondary first recycle gas stream to the furnace of the plant shown in FIG. 1. The method according to the invention is now illustrated by the following simulated example, in which a mixture of acid gas and sour water stripper gas from an oil refinery is treated in the plant shown in FIG. 1 of the drawings. The temperatures, pressures, and component flow rates for the different streams referred to in this example are shown in Table 1.

A fresh feed gas stream comprising hydrogen sulphide, ammonia, carbon dioxide, water vapour, and methane (Stream A), available at a temperature of about 70° C. and a pressure of 28 psia, is fed from pipeline 2 to burner 4 which fires into furnace 6. Burner 4 is supplied separately from pipeline 10 with a stream of commercially pure oxygen (Stream B), available at a temperature of about 20° C. and a pressure of 28 psia. Stream A is mixed with a first recycle stream (Stream C) and a portion (Stream D) of a second recycle stream prior to being fed to the upstream combustion stage of furnace 6. The temperature in the combustion stage of furnace 6 is high enough (about 1315° C.) to ensure the complete destruction of the ammonia present in the feed gas. A second portion (Stream E) of the second recycle stream is sent to the downstream thermal reaction stage of furnace 6.

An effluent gas stream (Stream F) leaves furnace 6 through outlet 12 at a temperature of about 1040° C. and enters waste heat boiler 14 in which it is cooled to a temperature of about 370° C. The cooled effluent gas stream (Stream G) passes from waste heat boiler 14 to sulphur condenser 16 in which it is further cooled to a temperature of about 150° C. and in which the sulphur vapour is condensed and is extracted (Stream H) via outlet 18. The resulting sulphur vapour-depleted gas stream (Stream I) is heated downstream of condenser 16 to a temperature of about 280° C. in reheater 20. The thus reheated sulphur vapour depleted gas stream (Stream J) flows into catalytic reactor 22. The hydrogen content of Stream J is adequate to cause the complete reduction to hydrogen sulphide of all the sulphur and sulphur dioxide present in it. A resulting reduced gas stream (Stream K) leaves catalytic reactor 22 at a temperature of about 370° C. and flows through heat exchanger 26 in which it is cooled to a temperature of about 150° C. The thus cooled gas stream (Stream L) is introduced into quench tower 28, where a water vapour-depleted gas stream (Stream M) is formed.

A first subsidiary stream (or first part) (Stream N) of Stream M is sent to absorber vessel 30 in which it is contacted with an aqueous solution of MDEA. Stream N enters absorber vessel 30 at the temperature of about 50° C. and a pressure of 23.6 psia. A hydrogen sulphide depleted gas (Stream 0) leaves the top of absorber vessel 30 through outlet 32 as a purge gas. A hydrogen sulphide rich gas (Stream C) leaves condenser 44 at a temperature of about 50° C. and a pressure of 28 psia, and flows back as a first recycle stream, without being reheated, to furnace 6. That part of the water vapour depleted gas stream which is not sent to absorber vessel 30 is returned to the furnace 6 as a second recycle stream (Stream P) via fan 60.

The composition, temperature, flow rate and pressure of each of the streams A to P are set out in Table 1 below.

TABLE 1

| Stream | A | B | C | D |
|---|---|---|---|---|
| Temperature (° F.) | 153.38 | 70.00 | 121.90 | 159.36 |
| Pressure (psia) | 28.0 | 28.0 | 28.0 | 28.0 |
| Hydrogen sulphide (lb-mole/hr) | 287.0826 | 0.0000 | 24.4967 | 99.6756 |
| Ammonia (lb-mole/hr) | 55.9967 | 0.0000 | 0.0000 | 0.0002 |
| Sulphur dioxide (lb-mole/hr) | 0.0000 | 0.0000 | 0.0000 | 0.0000 |
| Water (lb-mole/hr) | 58.8112 | 0.0000 | 2.2398 | 32.7149 |
| Carbon dioxide (lb-mole/hr) | 13.9887 | 0.0000 | 7.9165 | 105.6494 |
| Oxygen (lb-mole/hr) | 0.0000 | 192.7260 | 0.0000 | 0.0000 |
| Nitrogen (lb-mole/hr) | 0.0000 | 21.4140 | 0.0188 | 200.9567 |
| Hydrogen (lb-mole/hr) | 0.0000 | 0.0000 | 0.0006 | 8.8815 |
| Carbon monoxide (lb-mole/hr) | 0.0000 | 0.0000 | 0.0000 | 0.2724 |
| S2 (lb-mole/hr) | 0.0000 | 0.0000 | 0.0000 | 0.0000 |
| S6 (lb-mole/hr) | 0.0000 | 0.0000 | 0.0000 | 0.0000 |
| S8 (lb-mole/hr) | 0.0000 | 0.0000 | 0.0000 | 0.0000 |
| Methane (lb-mole/hr) | 4.2008 | 0.0000 | 0.0000 | 0.0000 |
| Carbon oxysulphide (lb-mole/hr) | 0.0000 | 0.0000 | 0.0001 | 0.0442 |
| Carbon disulphide (lb-mole/hr) | 0.0000 | 0.0000 | 0.0000 | 0.0000 |
| TOTAL (lb-mole/hr) | 420.0800 | 214.1400 | 34.6725 | 448.1949 |

| Stream | E | F | G | H |
|---|---|---|---|---|
| Temperature (° F) | 159.36 | 1902.24 | 700.00 | 299.82 |
| Pressure (psia) | 28.0 | 27.8 | 26.8 | 25.8 |
| Hydrogen sulphide (lb-mole/hr) | 103.8856 | 209.4392 | 209.4392 | 0.0333 |
| Ammonia (lb-mole/hr) | 0.0003 | 0.0006 | 0.0006 | 0.0000 |
| Sulphur dioxide (lb-mole/hr) | 0.0000 | 16.6079 | 16.6079 | 0.0050 |
| Water (lb-mole/hr) | 34.0966 | 502.9699 | 502.9699 | 5.9774 |
| Carbon dioxide (lb-mole/hr) | 110.1116 | 210.5976 | 210.5976 | 0.0074 |
| Oxygen (lb-mole/hr) | 0.0000 | 0.0000 | 0.0000 | 0.0000 |
| Nitrogen (lb-mole/hr) | 209.4445 | 459.8333 | 459.8333 | 0.0008 |
| Hydrogen (lb-mole/hr) | 9.2566 | 41.1266 | 41.1266 | 0.0001 |
| Carbon monoxide (lb-mole/hr) | 0.2840 | 31.4279 | 31.4279 | 0.0000 |
| S2 (lb-mole/hr) | 0.0000 | 144.3457 | 2.5022 | 2.4866 |
| S6 (lb-mole/hr) | 0.0000 | 0.0000 | 27.8712 | 27.6975 |
| S8 (lb-mole/hr) | 0.0000 | 0.0000 | 14.5575 | 14.4667 |
| Methane (lb-mole/hr) | 0.0000 | 0.0000 | 0.0000 | 0.0000 |
| Carbon oxysulphide (lb-mole/hr) | 0.0460 | 0.4913 | 0.4913 | 0.0000 |
| Carbon disulphide (lb-mole/hr) | 0.0000 | 0.0002 | 0.0002 | 0.0000 |
| TOTAL (lb-mole/hr) | 467.1252 | 1616.8401 | 1517.4253 | 50.6748 |

| Stream | I | J | K | L |
|---|---|---|---|---|
| Temperature (° F.) | 299.82 | 534.85 | 700.00 | 300.00 |
| Pressure (psia) | 25.8 | 25.3 | 25.1 | 24.6 |
| Hydrogen sulphide (lb-mole/hr) | 209.4059 | 209.4059 | 228.1989 | 228.1989 |
| Ammonia (lb-mole/hr) | 0.0006 | 0.0006 | 0.0006 | 0.0006 |
| Sulphur dioxide (lb-mole/hr) | 16.6029 | 16.6029 | 0.0000 | 0.0000 |
| Water (lb-mole/hr) | 496.9925 | 496.9925 | 499.0032 | 499.0032 |
| Carbon dioxide (lb-mole/hr) | 210.5902 | 210.5902 | 241.7850 | 241.7850 |
| Oxygen (lb-mole/hr) | 0.0000 | 0.0000 | 0.0000 | 0.0000 |
| Nitrogen (lb-mole/hr) | 459.8325 | 459.8325 | 459.8325 | 459.8325 |
| Hydrogen (lb-mole/hr) | 41.1265 | 41.1265 | 20.3227 | 20.3227 |
| Carbon monoxide (lb-mole/hr) | 31.4278 | 31.4278 | 0.6234 | 0.6234 |
| S2 (lb-mole/hr) | 0.0156 | 0.0156 | 0.0000 | 0.0000 |
| S6 (lb-mole/hr) | 0.1737 | 0.1737 | 0.0000 | 0.0000 |
| S8 (lb-mole/hr) | 0.0907 | 0.0907 | 0.0000 | 0.0000 |
| Methane (lb-mole/hr) | 0.0000 | 0.0000 | 0.0000 | 0.0000 |
| Carbon oxysulphide (lb-mole/hr) | 0.4913 | 0.4913 | 0.1011 | 0.1011 |
| Carbon disulphide (lb-mole/hr) | 0.0002 | 0.0002 | 0.0000 | 0.0000 |
| TOTAL (lb-mole/hr) | 1466.7505 | 1466.7505 | 1449.8676 | 1449.8676 |

| Stream | M | N | O | P |
|---|---|---|---|---|
| Temperature (° F) | 120.26 | 120.26 | 121.97 | 120.26 |
| Pressure (psia) | 23.6 | 23.6 | 22.6 | 23.6 |
| Hydrogen sulphide (lb-mole/hr) | 228.0782 | 24.5170 | 0.0203 | 203.5612 |
| Ammonia (lb-mole/hr) | 0.0005 | 0.0001 | 0.0001 | 0.0005 |
| Sulphur dioxide (lb-mole/hr) | 0.0000 | 0.0000 | 0.0000 | 0.0000 |
| Water (lb-mole/hr) | 74.8583 | 8.0468 | 5.8070 | 66.8115 |
| Carbon dioxide (lb-mole/hr) | 241.7474 | 25.9864 | 18.0699 | 215.7610 |
| Oxygen (lb-mole/hr) | 0.0000 | 0.0000 | 0.0000 | 0.0000 |
| Nitrogen (lb-mole/hr) | 459.8301 | 49.4289 | 49.4101 | 410.4012 |
| Hydrogen (lb-mole/hr) | 20.3227 | 2.1846 | 2.1840 | 18.1381 |
| Carbon monoxide (lb-mole/hr) | 0.6234 | 0.0670 | 0.0670 | 0.5564 |
| S2 (lb-mole/hr) | 0.0000 | 0.0000 | 0.0000 | 0.0000 |
| S6 (lb-mole/hr) | 0.0000 | 0.0000 | 0.0000 | 0.0000 |
| SB (lb-mole/hr) | 0.0000 | 0.0000 | 0.0000 | 0.0000 |
| Methane (lb-mole/hr) | 0.0000 | 0.0000 | 0.0000 | 0.0000 |
| Carbon oxysulphide (lb-mole/hr) | 0.1011 | 0.0109 | 0.0108 | 0.0902 |
| Carbon disulphide (lb-mole/hr) | 0.0000 | 0.0000 | 0.0000 | 0.0000 |
| TOTAL (lb-mole/hr) | 1025.5617 | 110.2416 | 75.5691 | 915.3201 |

What is claimed is:

1. A method of treating a feed gas stream containing hydrogen sulphide and carbon dioxide, comprising the steps of:

i) burning in a furnace part of the hydrogen sulphide content of the feed gas stream so as to form sulphur dioxide and water vapour, supplying oxygen gas to the furnace to support combustion of the said part of the feed gas stream and reacting in the furnace resulting sulphur dioxide with hydrogen sulphide so as to form an effluent gas stream containing sulphur vapour, water vapour, hydrogen sulphide, sulphur dioxide and carbon dioxide;

ii) extracting the sulphur vapour from the effluent gas stream by condensation as to form a sulphur-depleted gas stream;

iii) reducing to hydrogen sulphide the sulphur dioxide and other reducible sulphur species in the sulphur-depleted gas stream so as to form a reduced gas stream;

iv) removing most of the water vapour from the reduced gas stream so as to form a water vapour-depleted gas stream;

v) contacting a first part of the water vapour-depleted gas stream with at least one liquid phase absorbent for hydrogen sulphide in at least one absorber vessel so as selectively to absorb hydrogen sulphide from the water vapour-depleted gas stream and to form a hydrogen sulphide-depleted gas stream;

(vi) discharging the hydrogen sulphide-depleted gas stream as a purge stream;

(vii) desorbing hydrogen sulphide from the said absorbent so as to form at least one hydrogen sulphide rich gas stream;

(viii) returning to the furnace as a first recycle stream or streams at least part of the said hydrogen sulphide rich gas stream; and (ix) returning to the furnace as a second recycle stream a second part of the water vapour-depleted gas stream.

2. The method claimed in claim 1, additionally including the step of controlling the flow rate of the purge stream or the first part of the water vapour depleted gas stream so as substantially to prevent build-up of inert gases in the first and second recycle streams.

3. The method claimed in claim 1 in which the feed gas contains at least 70% by volume of hydrogen sulfide and the source of the oxygen gas is commercially pure oxygen or air that contains at least 80% by volume of oxygen.

4. The method claimed in claim 3, in which the source of the oxygen gas contains at least 90% by volume of oxygen.

5. The method claimed in claim 2, in which the rate of return of the second recycle stream to the furnace is greater than the rate of return of the first recycle stream(s) to the furnace.

6. The method claimed in claim 1, in which at least 90% of the sulphur dioxide that is formed in the furnace is reduced to sulphur vapour by reaction with hydrogen sulphide.

7. The method claimed in claim 1, in which the feed gas is fed to the furnace at a temperature in the range of 0° C. to 90° C.

8. The method claimed in claim 1, in which the feed gas is fed to the furnace at a temperature in the range of 10° C. to 60° C.

9. The method claimed in claim 1, in which the first recycle gas is returned to the furnace at a temperature in the range of 0° C. to 90° C.

10. The method claimed in claim 2, in which the second recycle gas is returned to the furnace at a temperature in the range of 0° C. to 90° C.

11. The method claimed in claim 1, in which the said part of water vapour-depleted gas stream of step (v) is brought into contact at a temperature in the range of 50° C. to 90° C. with the absorbent.

12. The method claimed in claim 1, in which the desorption of the hydrogen sulphide from the absorbent takes place at a higher pressure than the absorption of the hydrogen sulphide by the absorbent.

13. The method claimed in claim 1, in which the furnace is operated with an upstream combustion region and a downstream thermal reaction region, the or each first recycle stream is returned to the upstream combustion region and the second recycle stream is returned at least in part to the downstream thermal reaction region.

14. The method claimed in claim 1, in which the flow rates of the first and second recycle streams are such that at least 99.7 mole % of all the sulphur atoms in the feed gas stream are recovered by the condensation of the sulphur vapour.

15. The method claimed in claim 1, in which there are two hydrogen sulphide absorber vessels arranged in series with a hydrogen sulphide lean gaseous fraction being sent from the upstream vessel to the downstream vessel for further separation of the hydrogen sulfide, the absorbent in the upstream vessel being different from that in the downstream vessel, the absorbent in the downstream vessel having a higher selectivity for hydrogen sulphide than the one in the upstream vessel.

16. The method claimed in claim 15, wherein there are two desorption vessels, each being employed to form a hydrogen sulphide rich gas stream, the hydrogen sulphide rich gas streams being directed separately or together to the furnace as the first recycle gas streams.

* * * * *